No. 813,185. PATENTED FEB. 20, 1906.
B. VOLKMAR.
SPEED INDICATOR.
APPLICATION FILED JULY 21, 1905.

WITNESSES:

INVENTOR
Bernhard Volkmar
BY
ATTORNEYS

UNITED STATES PATENT OFFICE.

BERNHARD VOLKMAR, OF NEW YORK, N. Y., ASSIGNOR, BY DIRECT AND MESNE ASSIGNMENTS, TO THE ACME AUTO-METER COMPANY, OF NEW YORK, N. Y.

SPEED-INDICATOR.

No. 813,185.　　　Specification of Letters Patent.　　　Patented Feb. 20, 1906.

Application filed July 21, 1905. Serial No. 270,611.

*To all whom it may concern:*

Be it known that I, BERNHARD VOLKMAR, a citizen of the United States, and a resident of the city of New York, borough of Manhattan, in the county and State of New York, have invented a new and Improved Speed-Indicator, of which the following is a full, clear, and exact description.

The purpose of the invention is to provide a speed-indicator which will have an exceedingly simple arrangement of parts and which will be capable of indicating a greater number of miles than any other speed-indicator of which I have knowledge of the same size and type.

A further purpose of the invention is to provide a construction of speed-indicator in which a governor-ring has sliding motion upon the shaft and is connected with a long tapered cone that slides upon the shaft, which cone operates a chain of gearing for moving a hand or pointer over the dial.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
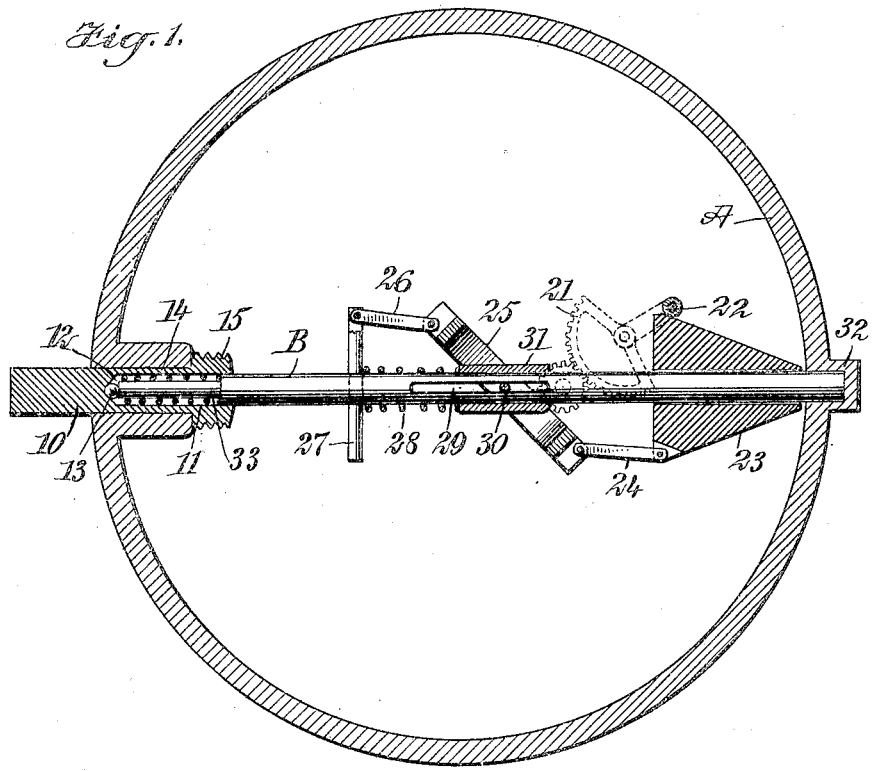
Figure 2:
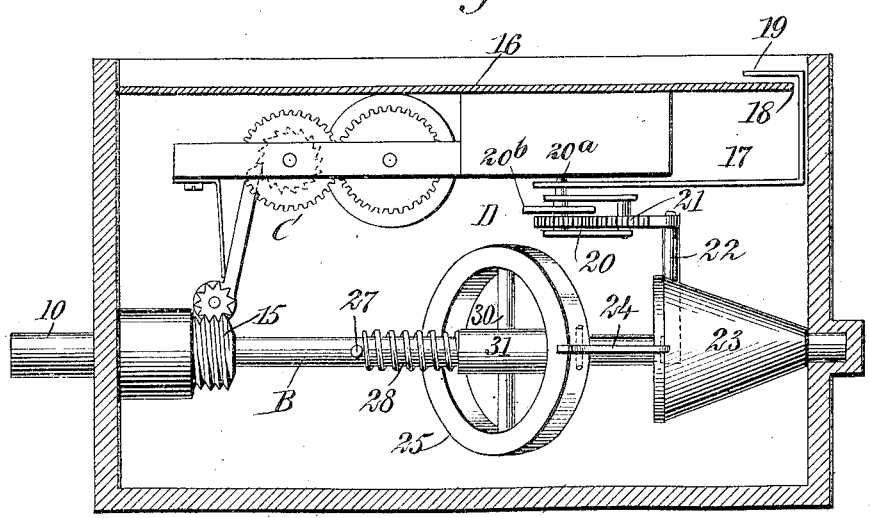

Figure 1 is a horizontal section through the casing of the speed-indicator and a sectional plan view of the improved mechanism, and Fig. 2 is a vertical section through the casing and a side elevation of the improved mechanism.

A represents the casing of the indicator, which is circular, B the shaft, which is driven in the casing by means of frictional engagement with the usual coupling 10, adapted for connection with an axle of a vehicle or any other moving object whose speed is to be taken; but the said coupling 10 is provided with a longitudinal chamber 11, extending from its inner end a desired distance outward, and the rear or outer wall 12 of this chamber is conical. The conical portion is provided with one or more ball-bearings 13, and, furthermore, a coiled spring 14 is located in the said chamber 11, as is shown in Fig. 1.

I have illustrated a worm 15 at the inner end of the coupling 10 and have also indicated sundry of the parts of the mechanism of an odometer operated from said worm; but such parts and such connections constitute no portion of the invention.

The casing is provided with a dial 16, on which is produced in any suitable or approved manner a scale of miles.

D represents the driving mechanism for the hand employed, consisting of a gear 20 on a suitable spindle 20$^a$ and a main spring 20$^b$, the hand 17 being secured to the said spindle. This hand is usually carried up and down through a space 18 between the margin of the dial and the inner face of the casing, as is shown in Fig. 2, and is then carried over the dial 16 to constitute a pointer 19, that travels over the scale, thus permitting the dial to be unobstructed for the introduction of other mechanism, such as an odometer or a clock, without interfering with the speed-indicating mechanism, and, furthermore, enabling the scale to be made quite large. The gear 20 of the said mechanism D meshes with the teeth of a segment 21, which may be mounted in the frame of the said driving mechanism, and the said segment is provided with an extension from its pivot. The said extension is provided with a roller-arm 22 of sufficient length to reach and move upon the outer face of a cone 23, mounted to slide on the shaft B.

The cone 23 has a very long taper, as is shown in both figures of the drawings, and said cone at a point in its base or wider end at the periphery has a link 24 pivoted thereto. This link 24 is also pivoted to a governor-ring 25, through which ring the shaft B is centrally passed. A second link 26 is pivoted to the governor-ring 25 diagonally opposite the pivotal point of the link 24, and said second link 26 is attached to a post 27, which passes through and is fixed to the shaft B. This post serves as an outer end bearing for a spring 28, which is coiled around the shaft B.

The shaft B is provided with a central longitudinal slot 29, as is shown in Fig. 1, and a pin 30, which extends from one side of the ring to the other, is passed through said slot. The said pin is made to enter the said ring about centrally between the links 24 and 26, and the pin 30 likewise passes through a sleeve 31, which slides on the shaft B and engages with the inner end of the spring 28.

The shaft B at one end is mounted to turn in a bearing 32, formed in the casing, and its opposite end 33 is reduced and is made to pass through the spring 14 in the chamber 11 of the coupling 10 in close frictional engagement with said spring and to an engagement with the ball-bearing 13, as is shown in Fig. 1. Thus the shaft B is turned by frictional engagement with the coupling 10. As the speed increases the centrifugal force of the governor-ring will cause the cone 23 to move more or less in direction of the center of the shaft and permit the pin 22 to travel a greater or a less distance down the cone, and thus exert more or less influence upon the hand 17 through the segment 21 and the driving mechanism D.

It will be noticed that the shaft B is cushioned by the spring where it connects with the coupling 10, so that when the coupling sustains jar, as frequently happens when the wheels pass over rough ground or over stones, the shock is not communicated to the shaft B, and consequently the rapid vibration of the hand at such time, which so frequently occurs, is obviated. The spring 28 serves to facilitate the return of the cone, as said spring is placed under tension when the cone is drawn inward by the centrifugal force of the governor-ring.

By means of the sliding governor-ring I obtain about double the amount of force ordinarily obtained and a longer movement on the long tapered cone, and by employing the long tapered cone the instrument will show a greater number of miles than when the frustum only of a cone is employed.

Having thus described my invention, I claim as new and desire to secure by Letters Patent—

1. In a speed-indicator, a revolving shaft, a cone, a governor-ring having connection with a fixed point on the shaft and mounted to slide on the shaft, the said ring also having connection with said cone, and means for resisting the centrifugal force of the said ring.

2. In a speed-indicator, a drive-shaft, a governor-ring having connection with the fixed point on the shaft and mounted to slide on the shaft, and means for resisting the centrifugal force of the ring.

3. In a speed-indicator, a drive-shaft, a governor-ring mounted to turn with and have sliding movement upon the said shaft, a long tapered cone, a link connection between the cone and the governor-ring, and an opposing link connection between the governor-ring and a projection from the shaft.

4. In a speed-indicator, a revolving shaft, a governor-ring mounted to slide on the shaft and turn therewith, a cone having link connection with the ring, a tension-stop for the ring, a train of gearing, a hand operated thereby, a segment which operates the train of gearing, and an arm from the segment which engages with the periphery of the cone.

5. In a speed-indicator, a shaft, a governor, a long tapered cone sliding upon the said shaft and connected with the governor, a train of gearing adapted to operate a hand or pointer, a segment in operative connection with the gearing, and an arm from the said segment which engages the peripheral surface of the cone.

6. In a speed-indicator, the combination with the casing, the shaft mounted to turn therein, having a longitudinal central slot, and a post extending through the shaft at one end of the slot, of a cone mounted to slide on the shaft at the opposite end of the said slot, a governor-ring through which the said shaft passes, a link connection between the ring and the cone, an opposing link connection between the said ring and the said post, a sleeve mounted to slide on the shaft within the ring, a pin extending from side to side of the governor-ring between the links, which pin passes through the said sleeve and the slot in the said shaft, having sliding movement in the said slot, a spring coiled around the said shaft, bearing against the said sleeve and the said post, a train of gearing, a hand or pointer operated thereby, a segment in operative engagement with the said train of gearing, and a roller-arm extending from the segment to an engagement with the peripheral portion of the cone.

In testimony whereof I have signed my name to this specification in the presence of two subscribing witnesses,

BERNHARD VOLKMAR.

Witnesses:
J. FRED. ACKER,
EVERARD B. MARSHALL.